(12) United States Patent
Koehler et al.

(10) Patent No.: US 9,515,304 B2
(45) Date of Patent: Dec. 6, 2016

(54) BATTERY TRAY FOR A BATTERY HOUSING OF A MOTOR VEHICLE BATTERY

(71) Applicant: Dr. Ing. h.c. F. Porsche Aktiengesellschaft, Stuttgart (DE)

(72) Inventors: Norman Koehler, Haldensleben (DE); Jens Bohlien, Stuttgart (DE); Marco Geuther, Langenau (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 29 days.

(21) Appl. No.: 14/627,043

(22) Filed: Feb. 20, 2015

(65) Prior Publication Data
US 2015/0236312 A1 Aug. 20, 2015

(30) Foreign Application Priority Data
Feb. 20, 2014 (DE) .................. 10 2014 102 202

(51) Int. Cl.
*H01M 2/10* (2006.01)

(52) U.S. Cl.
CPC ......... *H01M 2/1072* (2013.01); *H01M 2/1083* (2013.01); *H01M 2220/20* (2013.01)

(58) Field of Classification Search
CPC ........... H01M 2/1072; H01M 2/1083; H01M 2220/20
See application file for complete search history.

(56) References Cited

U.S. PATENT DOCUMENTS

2009/0044997 A1* 2/2009 Picavet ............... H01M 2/1083
180/68.5
2009/0242299 A1* 10/2009 Takasaki .................. B60K 1/04
180/68.5

FOREIGN PATENT DOCUMENTS

| DE | 102005055110 | 5/2007 |
|----|--------------|--------|
| DE | 102006026619 | 1/2008 |
| DE | 102007007956 | 8/2008 |
| EP | 1069632 | 1/2001 |
| EP | 2527205 | 11/2012 |
| GB | 2120004 | 11/1983 |

\* cited by examiner

*Primary Examiner* — Jane Rhee
(74) *Attorney, Agent, or Firm* — Gerald E. Hespos; Michael J. Porco; Matthew T. Hespos

(57) ABSTRACT

A battery tray (1) has a base for receiving a base (16) of a battery housing (2), opposed side walls (17, 18), an end wall (19) that connects the side walls (17, 18) and a clamp (22) that is connectable to the base (16). The end wall (19) and a first side wall (17) have grooves (24, 23) running parallel to the base (16) for receiving projections (10, 12) of the battery housing (2). The clamp (22) connects to the base (16) on the side of the battery tray (1) that faces away from the end wall (19). The clamp (22) has a block-forming element (29) for positioning the battery housing (2) on the side facing the second side wall (18), and the second side wall (18) has a block-forming element (30) in the region of the end wall (19), for positioning the battery tray (2) on the side facing the second side wall (18).

13 Claims, 10 Drawing Sheets

BATTERY TRAY FOR A BATTERY HOUSING OF A MOTOR VEHICLE BATTERY

CROSS REFERENCE TO RELATED APPLICATION

This application claims priority under 35 USC 119 to German Patent Appl. No. 10 2014 102 202.5 filed on Feb. 20, 2014, the entire disclosure of which is incorporated herein by reference.

BACKGROUND

1. Field of the Invention

The invention relates to a battery tray for a battery housing of a motor vehicle battery, the battery housing having outwardly directed projections on sides in each case facing away from one another in the base region, wherein the battery tray has a base for receiving the battery housing in the region of the base thereof, side walls on two sides facing away from each other, an end wall connected to the side walls and a clamping element which is connectable to the base, wherein an end wall and a first side wall of the side walls are provided with groove-shaped recesses running parallel to the base for the insertable receiving of those projections of the battery housing which face said walls, and, for the engagement behind that projection of the battery housing which faces the clamping element, the clamping element is connectable to the base on that side of the battery tray which faces away from the end wall.

2. Description of the Related Art

A battery for a motor vehicle typically is substantially box-shaped and therefore has a box-shaped battery housing. The battery housing has outwardly directed projections on sides that face away from one another. The projections have a rectangular cross section with a lower section that is parallel to the plane of support of the battery housing on the base of the battery tray. Alternatively, the projections can taper outward so that the upper surface of the projection is inclined with respect to the lower surface of the projection. The battery tray then is provided with groove-shaped recesses arranged parallel to the base of the battery tray. This design permits an interlocking arrangement of the recesses in the battery tray with the projections of battery housing. The interlocking arrangement is intended to prevent the battery from slipping with respect to the battery tray. Thus, moments acting on the battery and resulting upwardly directed forces will not cause the battery from being levered out of the anchorage in the battery tray in the event of a crash.

EP 2 527 205 A1 discloses a battery tray that has an end wall and a first side wall formed with groove-shaped recesses running parallel to the base and configured for receiving the projections of the battery housing that face those walls. A clamping element extends on the side of the battery tray that faces away from the end wall and is connectable to the base while engaging behind the projection of the battery housing in this region. The battery housing is placed onto the base of the battery tray and is inserted into a bearing position against the end wall and the side wall. The clamping element then is fastened to the base of the battery tray. In addition, the second side wall also can have a groove-shaped recess in the region of the end wall and running parallel to the base for receiving the projection of the battery housing that faces this region of the side wall.

The battery tray has receptacles for holding and guiding holding means that are guided at the top over the motor vehicle battery and bear against the battery to prevent the motor vehicle battery from being levered out in the event of a crash.

It is an object of the invention to provide a battery tray that has no holding means guided over the motor vehicle battery, but that ensures secure fixing of the battery when subjected to crash forces that exert a vertically directed lifting-out force on the motor vehicle battery.

SUMMARY OF THE INVENTION

The invention provides a clamping element with a first block-forming element for positioning the battery tray on the side facing the second side wall, and the second side wall has a second block-forming element in the region of the end wall for positioning the battery tray on the side thereof facing the second side wall.

The facing projections of the battery housing therefore engage behind the first side wall and the end wall in the region of the groove-shaped recesses thereof. Furthermore, on the side of the battery tray that faces away from the end wall, the clamping element engages behind that projection of the battery housing that faces the clamping element. The two block-forming elements position the battery housing against the first side wall and therefore act as stop. The block-forming elements prevent the inserted battery housing from being displaced relative to the battery tray in one degree of freedom, namely in the direction of effect of the block-forming elements.

The battery housing therefore is held on all sides against displacement in the longitudinal and transverse directions and against lifting off from the base of the battery tray because of the interlocking connection. As a consequence, it is not necessary to provide additional holding means guided at the top over the motor vehicle battery and connected to the battery housing.

The clamping element may be designed in a structurally simple manner, and the battery housing can be fixed optimally in the region of two adjacent walls by the clamping element if the clamping element is of L-shaped design. Thus, a long limb of the L may be configured for clamping the battery housing on the side facing away from the end wall, and a short limb of the L may form the block. When the clamping element is fastened to the base of the battery tray, the short limb of the L defines the distance from the first side wall since the battery housing does not bear in the region of the clamping element against the second side wall.

The two limbs of the L represent an angle that corresponds to the angle diametrically with respect to the L-shaped clamping element, and therefore to the angle between end wall and first side wall. The battery housing is clamped in the battery tray between the components that define these diametrical angles.

The battery tray may have a lightweight construction with maximum rigidity. For this purpose, the lower side of the battery tray may have ribs. The ribs impart a high degree of flexural rigidity to the base of the battery tray, at a low weight. The side walls and the end wall also may have ribs to achieve a high degree of rigidity of the side walls and end wall at a relatively low weight. The side walls and the end wall are intended to have the ribbed structure at least in a partial region. In particular wherever increased forces in the event of a crash are introduced into the battery tray, such as in the region of the recesses of the battery tray.

The battery tray may be produced by a deforming production process, such as, for example, injection molding or die casting and may be composed of a thermoplastic or a light metal.

The battery housing may be fixed in a defined manner in the plane of the base of the battery tray to achieve crash safety and to prevent the motor vehicle battery or the battery housing from being displaced or detached with respect to the battery tray. Thus, the end wall may have profilings for interlocking engagement in profilings of the facing projections of the battery housing. The profilings may be in the region of the groove-shaped recess and/or the clamping element on the side facing the end wall.

Production tolerances have to be taken into consideration both during the production of the battery tray and during the production of the battery housing. It is considered particularly important to be able to compensate for the production tolerances in the direction of effect of the clamping element on the battery housing. Accordingly, it is considered particularly advantageous to connect the clamping element to the base of the battery tray by at least one screw. The screw may pass through a bearing element that permits the clamping element to be accommodated with play in the Y direction of the vehicle coordinate system, i.e. in the transverse direction of the vehicle.

This play is ensured in a structurally simple manner if the bearing element has a first bearing element part with an inclined upper surface that forms part of the clamping element and a second separate bearing part with an inclined lower surface in contact with the inclined surface. A threaded bolt of the screw passes through a hole in the second bearing part and a hole in the first bearing part with play in the Y direction of the vehicle coordinate system. The screw is screwed into a threaded sleeve inserted into the base.

The battery tray is mounted in the bodywork of the motor vehicle in a structurally simple manner in that the battery tray is mounted in the region of the lower side of the base in a connecting bracket. In addition, the battery tray can have sleeves in the region of the base for receiving a bracket that is to be connected to the base. Further units of the motor vehicle can be fastened to said bracket, or the battery tray can be additionally supported in said bracket.

The battery tray according to the invention is used in particular in a motor vehicle in which the side walls of the battery housing are arranged in the transverse direction of the motor vehicle. The connecting bracket likewise runs here in the transverse direction of the motor vehicle and is preferably arranged, with respect to the orientation of the motor vehicle, in the front region of the battery tray.

Further features of the invention emerge from the dependent claims, the attached drawing and the description of the preferred exemplary embodiment reproduced in the drawing, without being restricted thereto.

DETAILED DESCRIPTION

Figure 1:
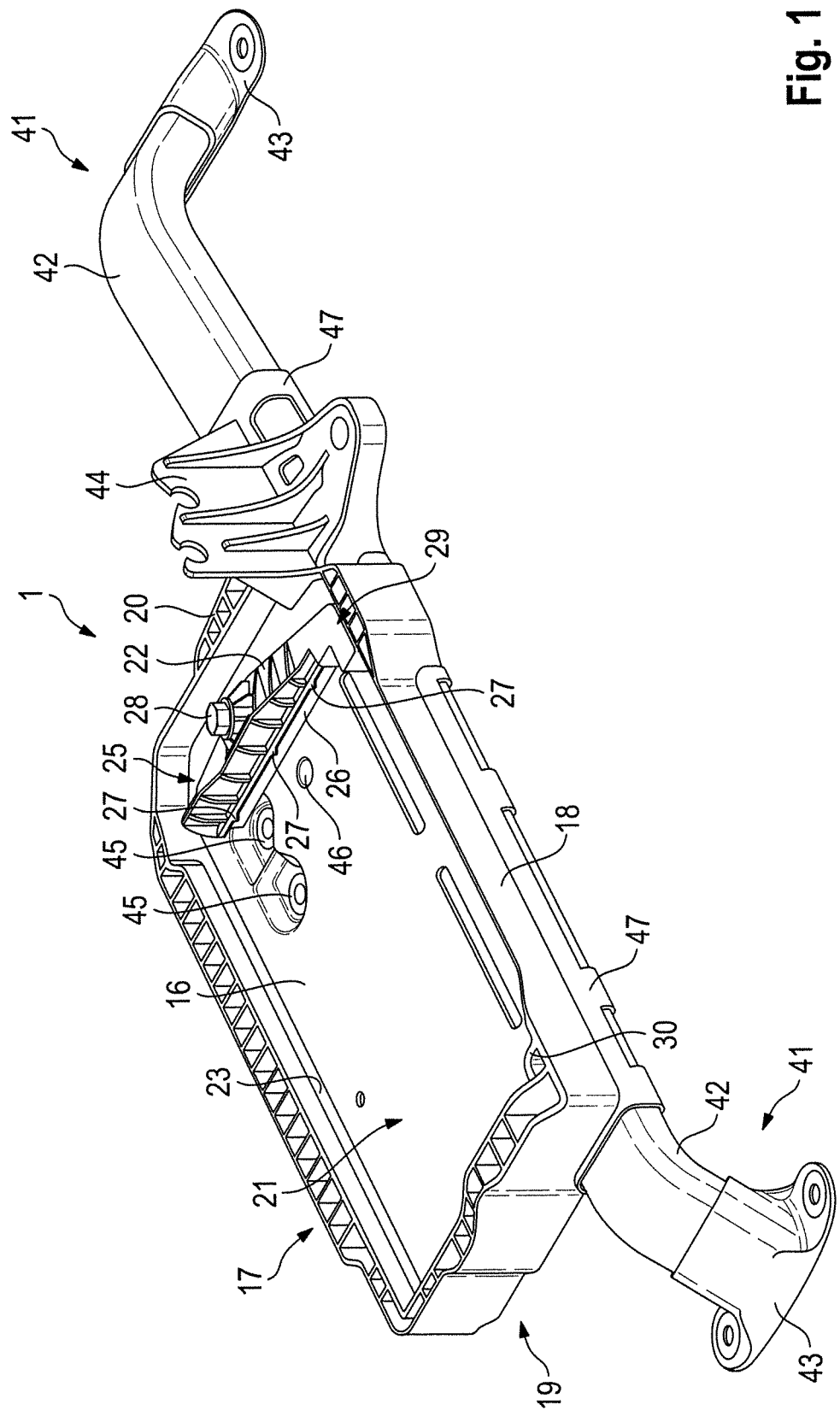
FIG. 1 is a perspective view of the battery tray a connecting bracket according to the invention.
Figure 4:
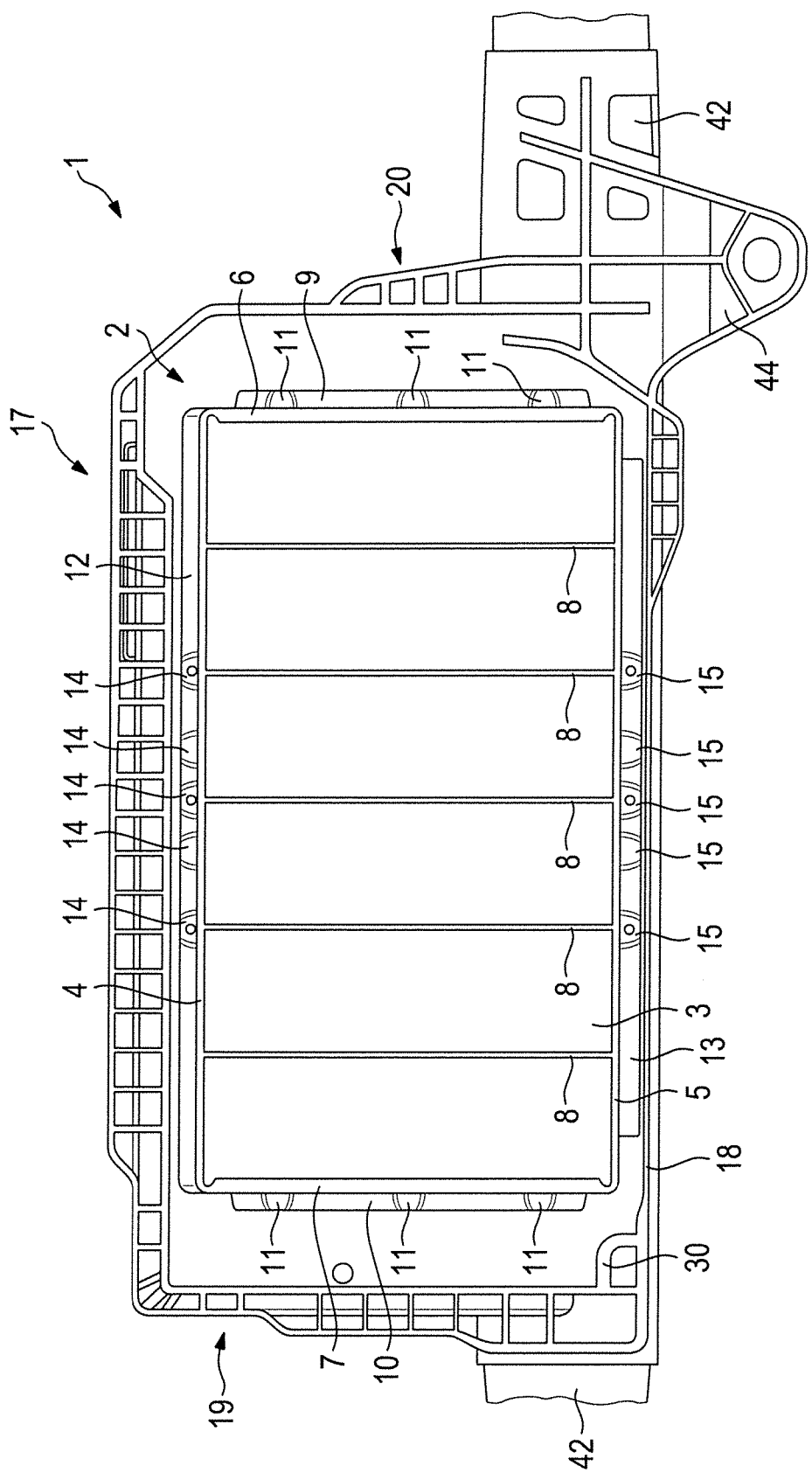
FIG. 4 is a top plan view of the battery tray and of a partial region of the connecting bracket, and with the battery housing placed on the base of the battery tray. but before the battery housing is displaced toward the first side wall and the end wall.

FIG. 1 shows a battery tray 1 for a battery housing 2 that is illustrated in top view in FIG. 4. The battery housing 2 has a box shape with a flat base 3, side walls 4, 5 arranged perpendicular to the base, and end walls 6, 7 connecting the side walls 4, 5. Five partitions 8 connect the side walls 4 and 5 and are arranged parallel to the end walls 6 and 7. Six chambers are formed within the battery housing 2 by the partitions 8. Only the battery housing 2 is illustrated, and therefore electrical internal components in the individual chambers are not shown.

In the region of the two end walls 6 and 7, the battery housing 2 has identically designed, outwardly directed projections 9, 10 that are parallel to and adjacent the base 3. The projection 10 is strip-shaped and extends over a length that is somewhat shorter than the length of the respective end wall 7 or 8. The upper side of the respective projection 10 has three depressions 11. In a corresponding manner, the side wall 4 or 5 has a projection 11 or 12 in the region of the base 3 and parallel thereto. The projection 12 extends over the entire length of the side wall 4 and is provided with five depressions 14. The length of the projection 13 is shorter than the length of the side wall 5. The projection also 13 is provided with five depressions which 15.

Figure 2:
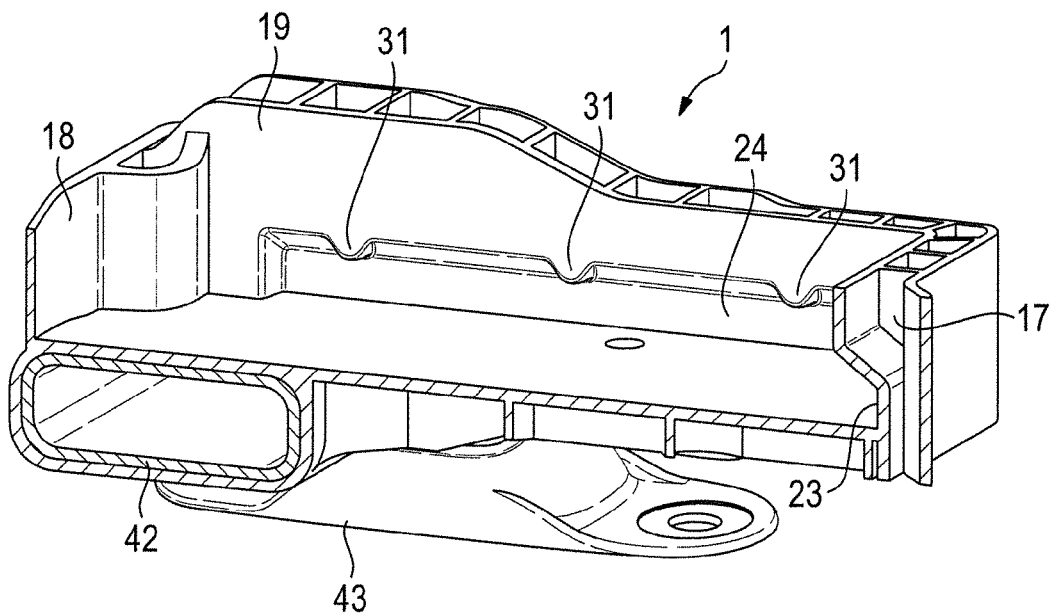
FIG. 2 is a section through the battery tray and the connecting bracket taken perpendicular to the longitudinal extent of the connecting bracket.

The battery tray 1 shown in FIG. 1 has a base 16 for receiving the base 3 of the battery housing 2. Opposed side walls 17, 18 project up from opposite sides of the base 16, and an end wall 19 connects the side walls. The battery housing 2 has a further end wall 20 parallel to the end wall 19. A receiving space 21 is provided between the side walls 17, 18 and the end walls 19, 20 for receiving the lower region of the battery housing 2 where the strip-shaped projections are provided. A clamping element 22 is connectable to the base 16 in proximity to the end wall 20. The side wall 17 is provided with a groove-shaped recess 23 that runs parallel to the base 16 and extends over substantially the entire length of the side wall 17. The recess 23 receives the projection 12 of the battery housing 2 when the battery housing 2 is mounted to the base 16. As shown in FIG. 2, the end wall 19 also has a groove-shaped recess 24 running parallel to the base 16. The recess 24 receives the projection 10 of the battery housing 2 when the battery housing 2 is mounted to the base 16.

The clamping element 22 is L-shaped and has a long limb 25 for clamping the battery housing 2 in the region of the projection 9 at the end wall 6. A recess 26 is formed in the region of the long limb 25 of the clamping element 22 and extends over substantially the entire length of the long limb 25. The recess 26 is parallel to the base 16 when the clamping element 22 is positioned and forms a groove for receiving the projection 9. The clamping element 22 has three downwardly directed projections 27 in the region of the recess 26 and is fastened to the base 16 of the battery housing 2 by means of a screw 28.

The L-shaped clamping element 22 also has a short limb 29 that runs at a right angle to the long limb 25 and functions as a block-forming element for positioning the battery housing 2 in the region of the side wall 5 thereof. Furthermore, the side wall 18 of the battery tray 1 has a further projection 30 adjacent the corner region with the end wall 19. The projection 30 extends over the height of the side wall 18 and defines a further block-forming element. The two block-forming elements—short limb 29 of the clamping element 22 and projection 30—function for the blocked positioning of the battery housing 12 between the limb 29, the projection 30 and the side wall 17 where the projection 12 of the battery housing 2 engages in the recess 23, when the projection 10 of the battery housing 2 engages in the recess 24 and when the projection 9 of the battery housing 2 engages in the recess 26.

The installation of the battery housing 2 in the battery tray 1 is shown with reference to the illustration of FIGS. 4 to 7.

Figure 5:
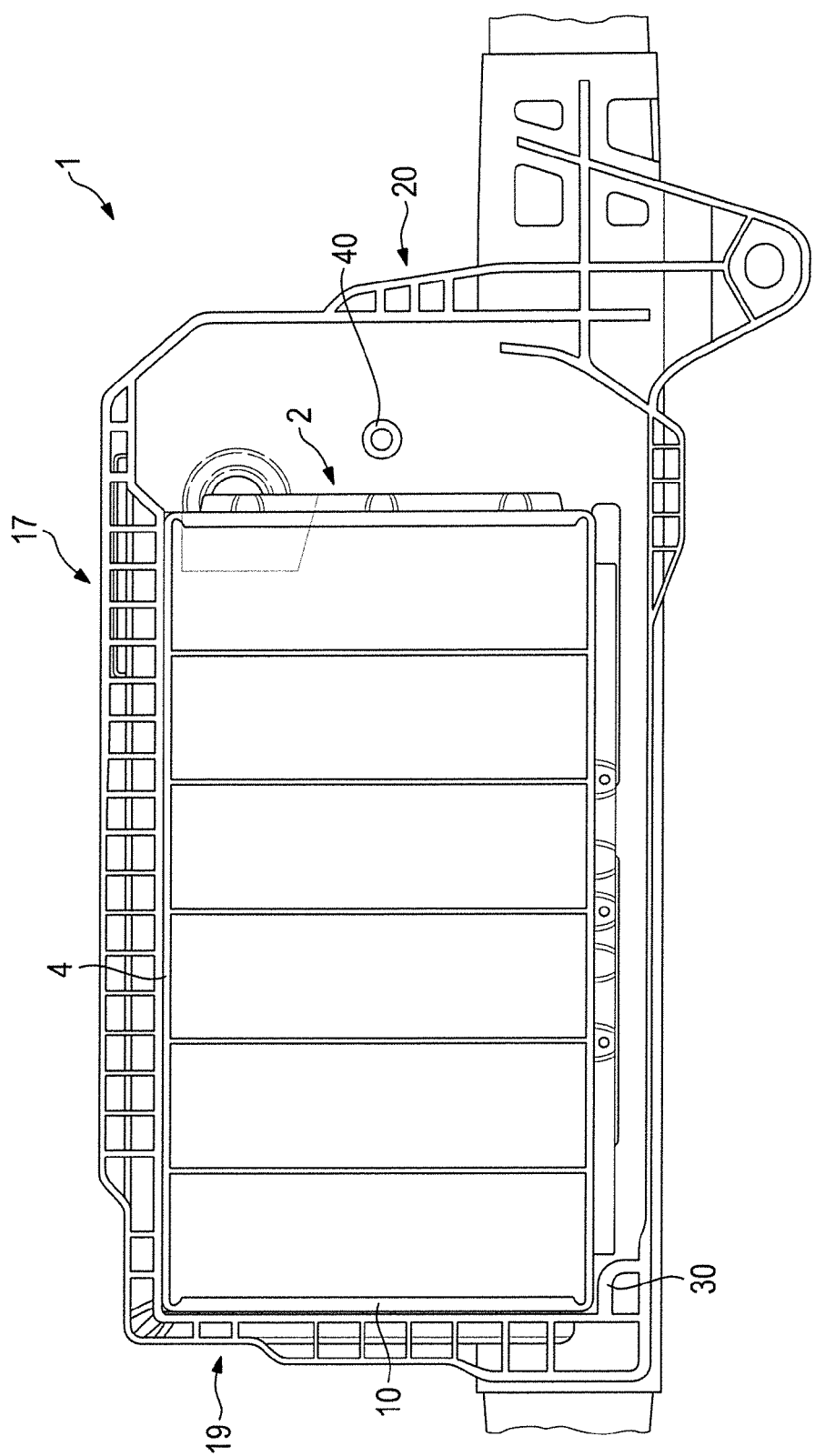
FIG. 5 shows the arrangement of FIG. 4, with the battery housing displaced against the first side wall and the end wall.
Figure 6:
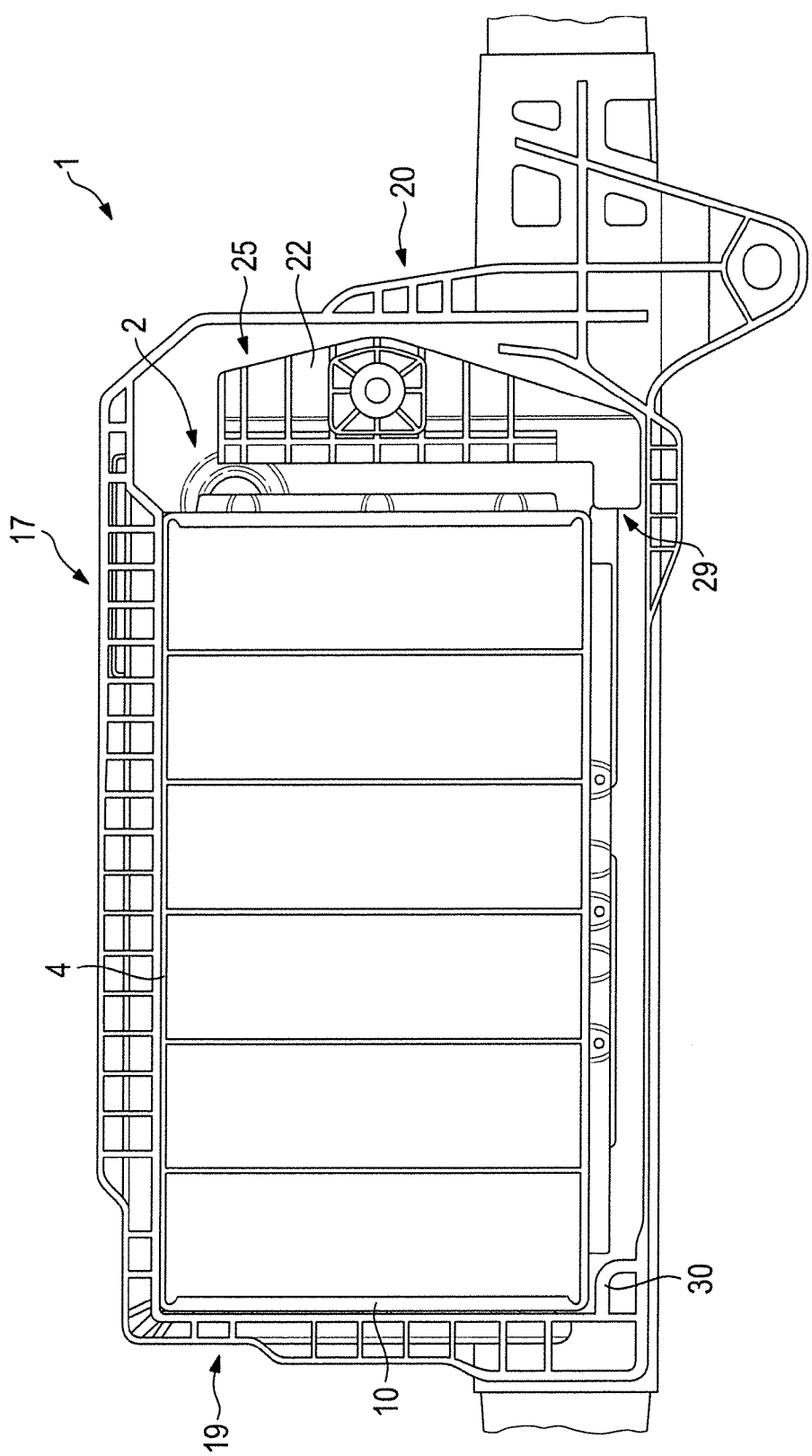
FIG. 6 shows the arrangement of FIG. 5, when the clamping element is placed onto the base of the battery housing and before the clamping element is pushed onto the battery housing.
Figure 7:
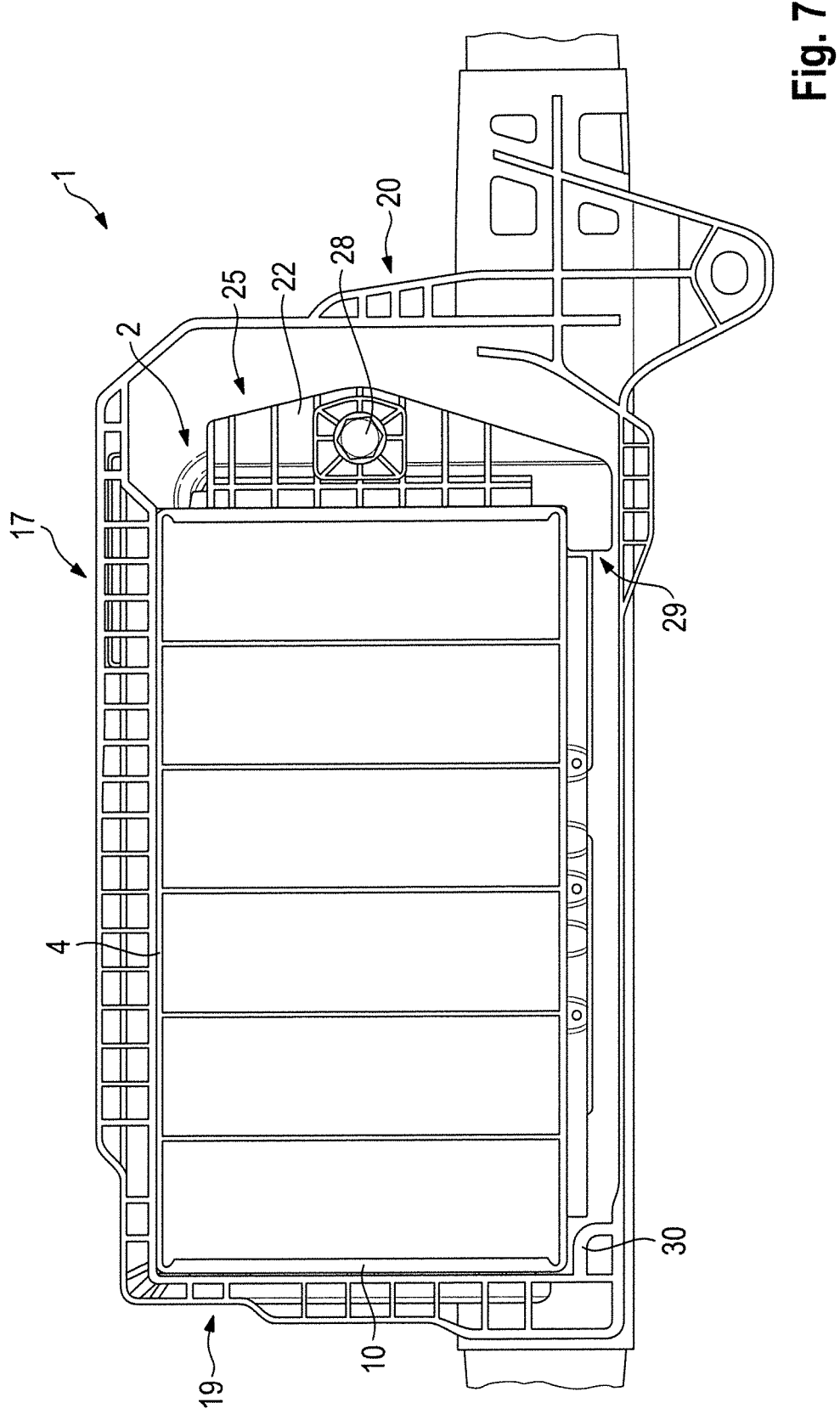
FIG. 7 shows the arrangement of FIG. 6, with the clamping element pushed onto the battery housing and screwed to the base of the battery tray.

FIG. 4 shows the battery housing 2 placed onto the base 16 of the battery tray 1. The battery housing 2 is positioned adjacent the side wall 18 that does not have a recess, and adjacent to the end wall 20. Starting from this position, the battery housing 2 is displaced simultaneously toward the side wall 17 and the end wall 19. Thus, the projections 10 and 12 of the battery housing 2 are inserted into the recesses 24 and 23 of the battery tray 1 and at the same time the interlocking connection is brought about between three downwardly directed projections 31 of the end wall 19 in the region of the recess 24 and the depressions 11 of the projection 10 of the battery housing 2 (FIG. 2). This position of battery housing 2 with respect to battery tray 1 is shown in FIG. 5.

The clamping element 22 is inserted into the space that has become free in the region of the end wall 20 because of the displacement of the battery housing 2 relative to the battery tray 1 (FIG. 6), and the clamping element 22 is moved with the two limbs 25, 29 thereof toward the battery housing 2 so that the long limb 25 of the clamping element 22 bears against the end wall 6 of the battery housing 2 and the short limb 29 of the clamping element 22 bears against the side wall 5 in the corner region of end wall 6 and side wall 5. The depressions 11 of the projection 9 of the battery housing 2 interact with the projections 27 of the clamping element 22. In this position of the clamping element 22 (FIG. 7), the screw 28 is used to secure the clamping element 22 to the battery tray 1 in the region of the base 16.

Figure 8:
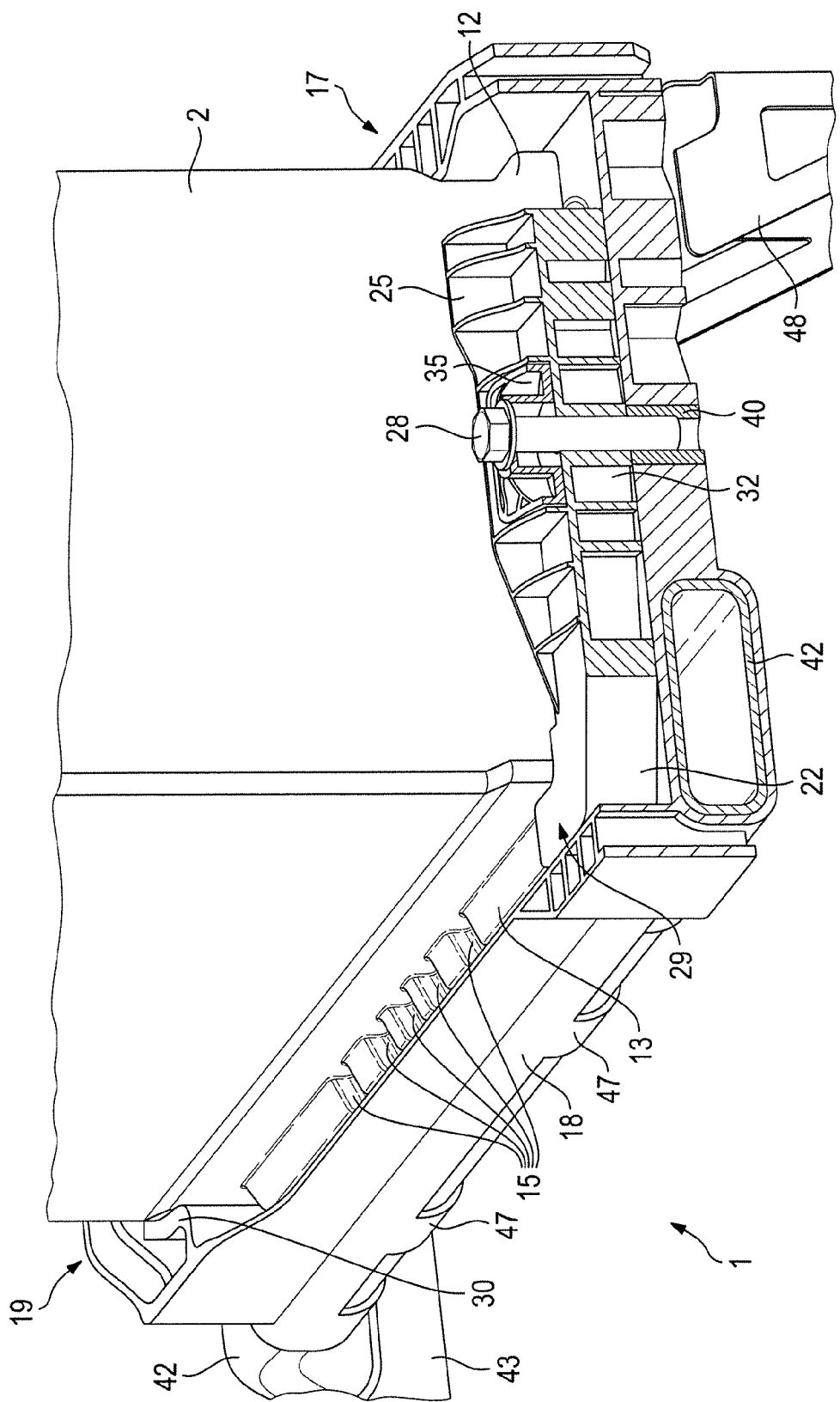
FIG. 8 is a perspective view of the arrangement of FIG. 7, sectioned transversely with respect to the longitudinal extent of the connecting bracket in the region of the screw connection of the clamping element and perpendicularly to the base of the battery tray.
Figure 9:
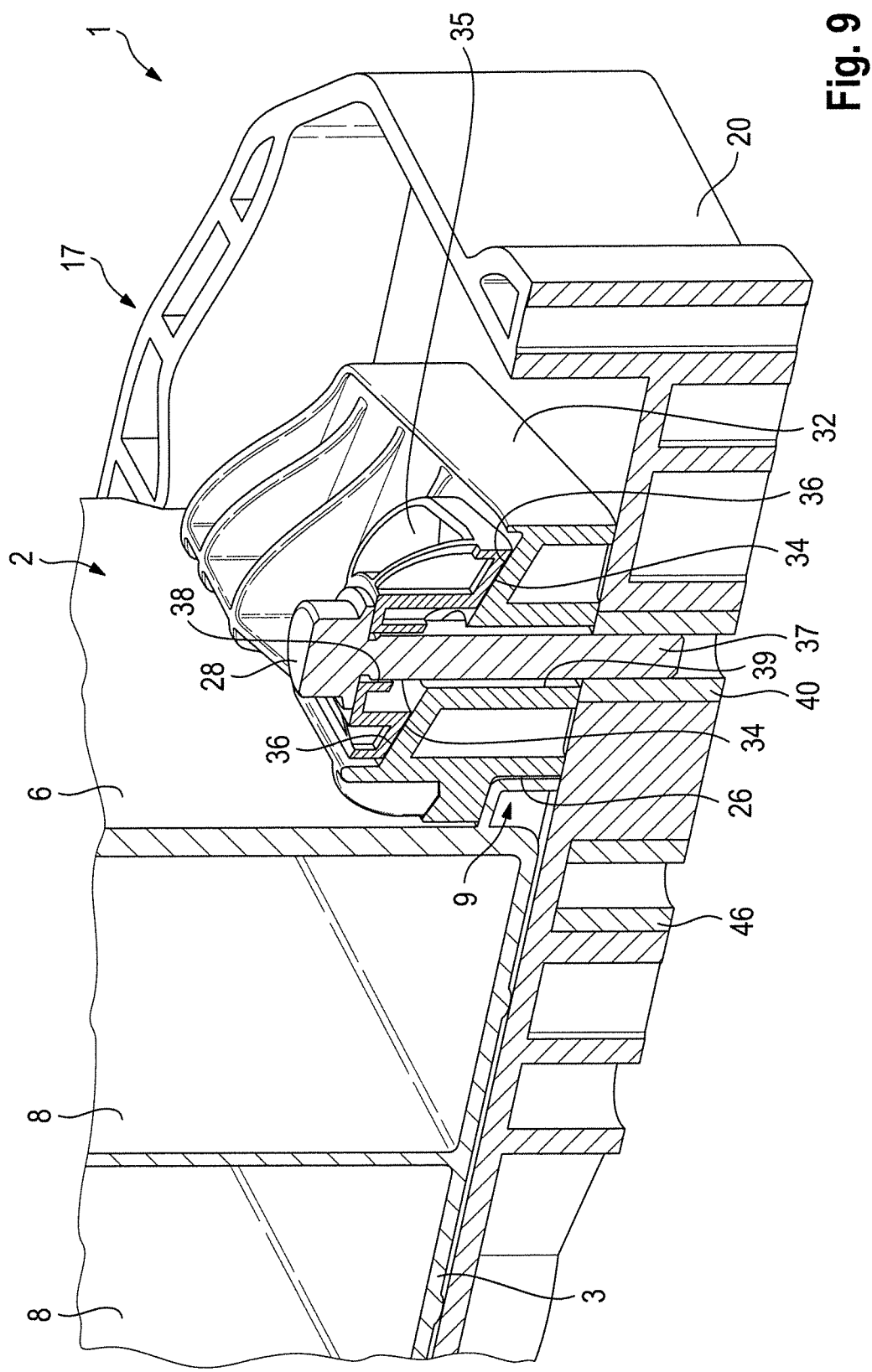
FIG. 9 shows the arrangement of FIG. 8 through the screw connection, but sectioned in the longitudinal extent of the connecting bracket, perpendicularly to the base of the battery tray.
Figure 10:
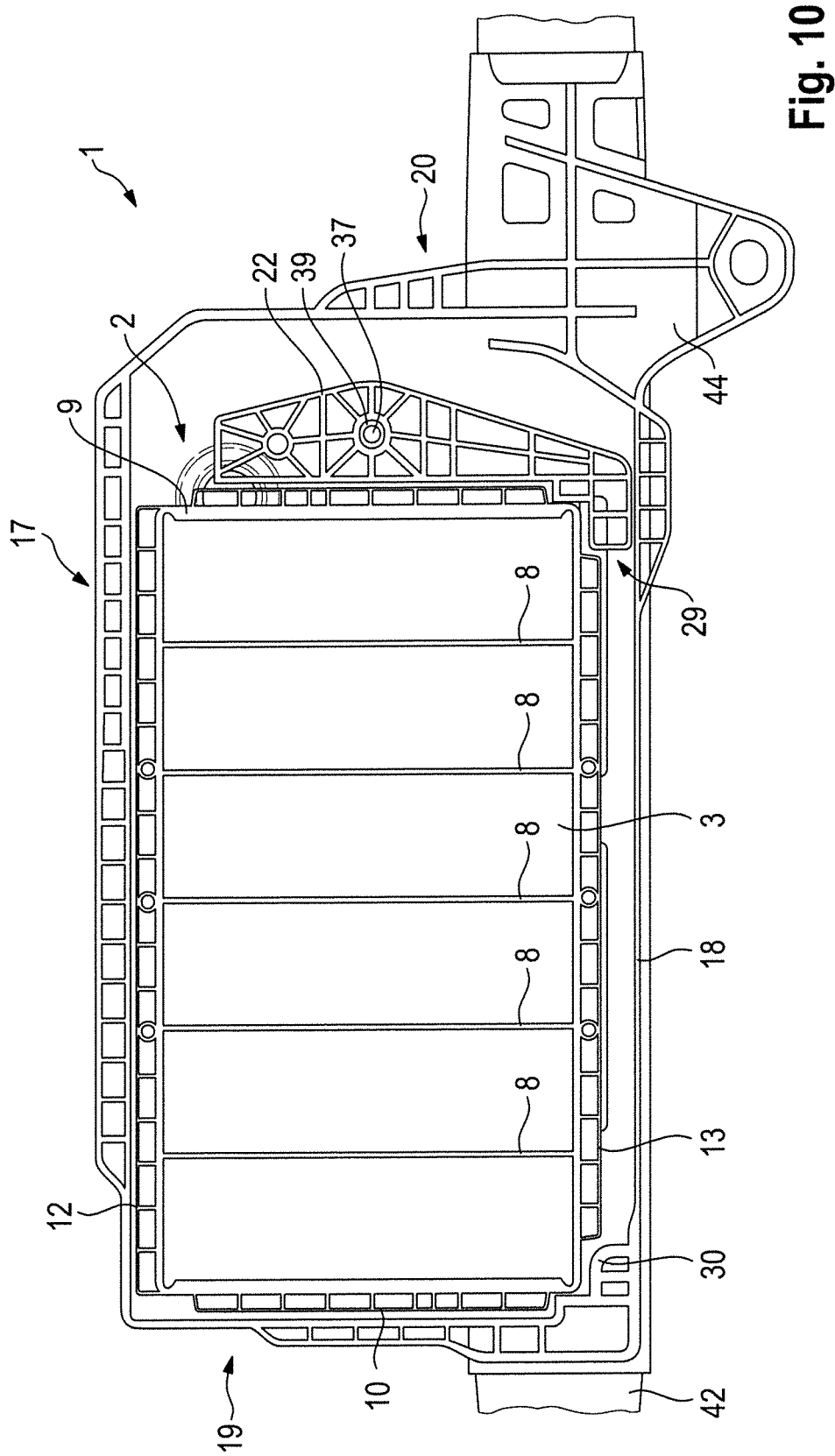
FIG. 10 is a top plan view of the arrangement of FIG. 5, and therefore of the battery housing pushed against the first side wall and the end wall, sectioned in a plane parallel to the base of the battery tray and level with the projections of the battery housing and the groove-shaped recesses of the battery tray.
Figure 11:
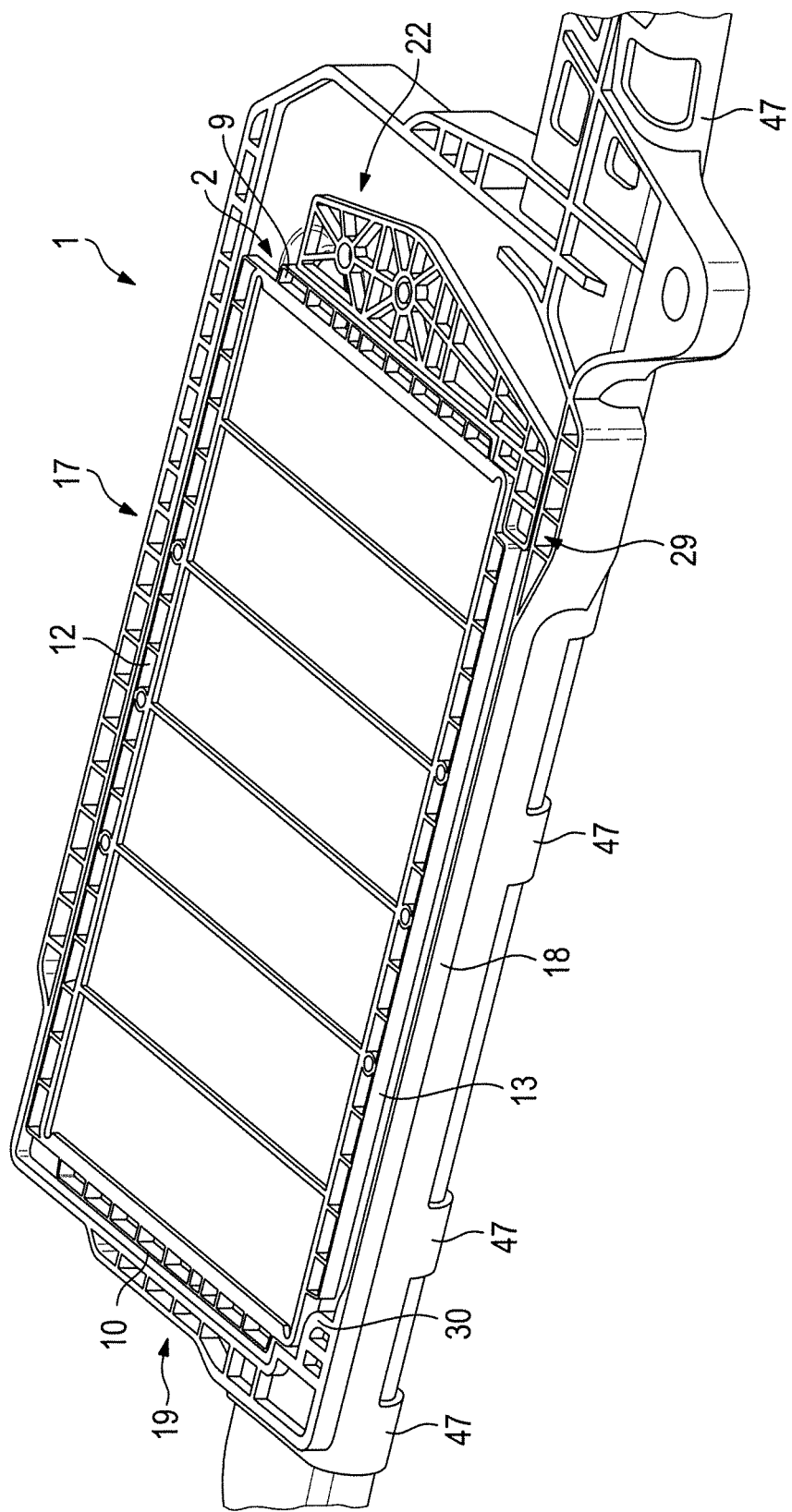
FIG. 11 is a top perspective view of the arrangement of FIG. 10.

The manner of the screw connection and a compensation for tolerances of the clamping element 22 in the transverse extent of the side walls 17 and 18 is clarified in FIGS. 8 and 9.

The screw 28 passes through a bearing element 32 that permits the clamping element 22 to be accommodated with play in the direction of the end wall 19. The bearing element 32 has a first bearing element part 33 with an inclined upper surface 34 that forms part of the clamping element 22. The bearing element 32 has a second, separate bearing part 35 with an inclined lower surface 36 that contacts the inclined upper surface 34. A threaded bolt 37 of the screw 28 passes through a hole 38 in the bearing part 35 and a hole 39 in the bearing part 32 with play in the Y direction of the vehicle coordinate system, i.e. the vehicle transverse direction. The screw 28 is screwed into a threaded sleeve 40 inserted into the base 16 of the battery tray 1. The play-affected mounting of the clamping element 22 of the battery tray 1 permits compensation for tolerances of battery housing 2 and/or battery tray 1.

A further threaded sleeve 46 is inserted into the base 16 and permits the clamping element 22 to be installed there to fit a differently sized battery housing 2.

The battery tray 1 includes ribs to provide both strength and a lightweight construction. In particular, the battery tray 1 has a ribbed structure on the lower side of the base 16, and along the entire lengths of the side wall 17 and the end wall 19 against which the inserted battery housing 2 bears. These areas must absorb high forces in the event of a crash. A ribbed structure also is provided at least partially in the region of the side wall 18 and the end wall 20. The ribs run vertically in the side and end walls and the base to impart a high degree of rigidity to the battery tray 1.

The battery tray 1 is produced from a thermoplastic or a light metal by a deforming production process, such as, for example, injection molding or die casting.

Figure 3:
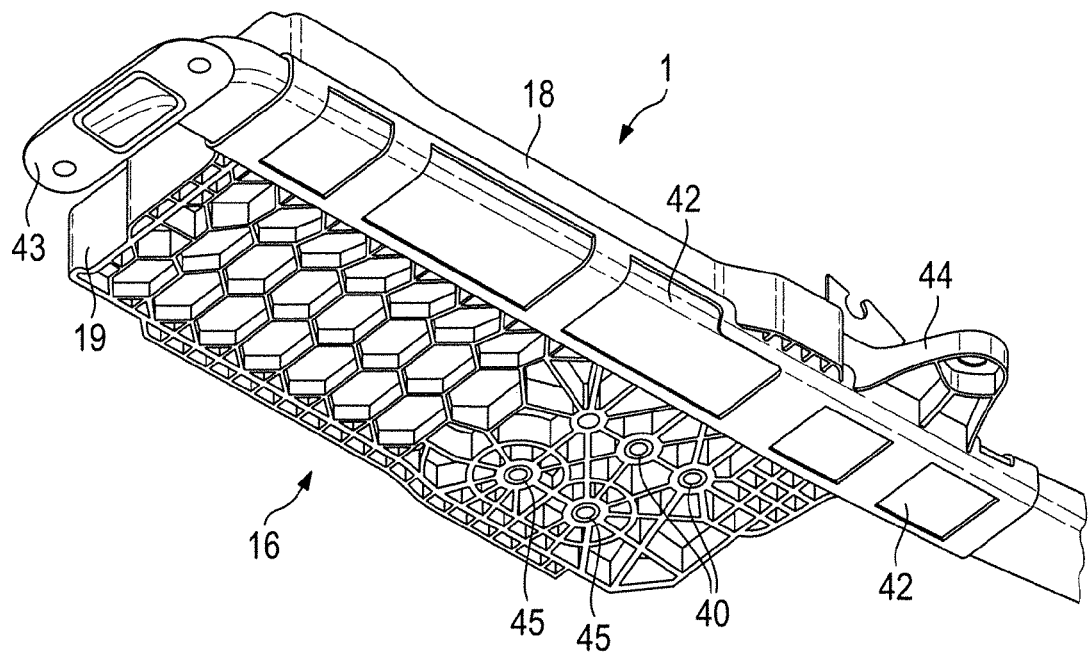
FIG. 3 is a bottom perspective view of the battery tray and the region of the connecting bracket that receives the battery tray.

Annular receptacles 47 are provided on the lower side of the battery tray 1 in the region of the side wall 18 and are mounted in a connecting bracket 41, as illustrated FIGS. 1 and 3. Ends of the connecting bracket 41 include carrier parts 42 that are received in supports 43. The supports 43 are composed of cast metal. The carrier part 42 preferably is a braided profile (Triax, GFRP/PA).

As illustrated in FIG. 1, an additional receptacle 44 may be integrated into the battery tray 1 and may function to receive a further vehicle component.

Sleeves 45 can be mounted in the base 16 of the battery tray 1 and can pass through the base 16. The sleeves 45 can receive a bracket 48 that can be connected to the base 16 to provide additional support for the battery tray 1.

The exemplary embodiment described therefore shows a battery tray 1 that is of lightweight construction and is suitable for securely holding the motor vehicle battery even in the event of a crash. This is achieved by the projections 12 and 10 of the battery housing 2 being held in an interlocking manner in the region of the side wall 17 and the end wall 19 of the battery housing 2, by the clamping element 22 engaging in an interlocking manner behind the projection 9 of the battery housing 2, by the dual formation of a block in the region of the short limb 29 of the clamping element 22, and by the projection 30. The battery housing 2 also is fixed between said the block formers and the side wall 17.

LIST OF REFERENCE NUMBERS

1 Battery tray
2 Battery housing

3 Base
4 Side wall
5 Side wall
6 End wall
7 End wall
8 Partition
9 Projection
10 Projection
11 Depression
12 Projection
13 Projection
14 Depression
15 Depression
16 Base
17 Side wall
18 Side wall
19 End wall
20 End wall
21 Receiving space
22 Clamping element
23 Recess
24 Recess
25 Long limb
26 Recess
27 Projection
28 Screw
29 Short limb
30 Projection
31 Projection
32 Bearing element
33 Bearing element part
34 Upper surface
35 Bearing element part
36 Lower surface
37 Threaded bolt
38 Hole
39 Hole
40 Threaded sleeve
41 Connecting bracket
42 Carrier part
43 Support
44 Receptacle
45 Sleeve
46 Threaded sleeve
47 Annular receptacle

What is claimed is:

1. A battery tray for a battery housing of a motor vehicle battery, the battery housing having outwardly directed projections on sides in each case facing away from one another in the base region, wherein the battery tray has a base for receiving the battery housing in the region of the base thereof, side walls on two sides facing away from each other, an end wall connected to the side walls and a clamping element that is connectable to the base, wherein the end wall and a first side wall of the side walls are provided with groove-shaped recesses running parallel to the base for the insertable receiving of those projections of the battery housing that face said walls, and, for the engagement behind that projection of the battery housing that faces the clamping element, the clamping element is connectable to the base on that side of the battery tray that faces away from the end wall, characterized in that part of the clamping element is a first block-forming element, for positioning the battery housing on the side thereof facing the second side wall of the side walls, and the second side wall has a second block-forming element in the region of the end wall, for positioning the battery tray on the side thereof facing the second side wall, the clamping element being connected to the base of the battery tray by at least one screw that passes through a bearing element that permits the clamping element to be accommodated with play in a Y direction of a vehicle coordinate system, and the bearing element having a first bearing element part with an inclined upper surface and forming part of the clamping element, and a second, separate bearing part with an inclined lower surface in contact with the inclined upper surface, a threaded bolt of the screw passing through a hole in the second bearing part and passing through a hole in the first bearing part with play in the direction of the end wall, and the screw being screwed into a threaded sleeve in the base.

2. The battery tray of claim 1, wherein the clamping element is L-shaped and has a long limb for clamping the battery housing on the side thereof facing away from the end wall and a short limb for forming the block.

3. The battery tray of claim 1, wherein a lower side of said battery tray has a plurality of ribs.

4. The battery tray of claim 1, wherein the side walls and the end wall have a plurality of ribs.

5. The battery tray of claim 1, wherein the battery tray is produced by a deforming production process.

6. The battery tray of claim 1, wherein the battery tray is formed from a thermoplastic.

7. The battery tray of claim 1, wherein the battery tray is formed from a light metal.

8. A battery tray for a battery housing of a motor vehicle battery, the battery housing having outwardly directed projections on sides in each case facing away from one another in the base region, wherein the battery tray has a base for receiving the battery housing in the region of the base thereof, side walls on two sides facing away from each other, an end wall connected to the side walls and a clamping element which is connectable to the base, wherein the end wall and a first side wall of the side walls are provided with groove-shaped recesses running parallel to the base for the insertable receiving of those projections of the battery housing which face said walls, and, for the engagement behind that projection of the battery housing which faces the clamping element, the clamping element is connectable to the base on that side of the battery tray that faces away from the end wall, a part of the clamping element defining a first block-forming element for positioning the battery housing on the side thereof facing the second side wall of the side walls, and the second side wall has a second block-forming element in the region of the end wall, for positioning the battery tray on the side thereof facing the second side wall, and wherein at least one of a region of the end wall with the groove-shaped recess and a side of the clamping element facing the end wall has profilings extending perpendicular to an extending direction of the groove shaped recess for interlocking engagement in profilings of the facing projections of the battery housing.

9. The battery tray of claim 8, wherein the clamping element is connected to the base of the battery tray by at least one screw that passes through a bearing element that permits the clamping element to be accommodated with play in a Y direction of a vehicle coordinate system.

10. The battery tray of claim 9, wherein the bearing element has a first bearing element part with an inclined upper surface and forms part of the clamping element, and a second, separate bearing part with an inclined lower surface in contact with the inclined upper surface, a threaded bolt of the screw passing through a hole in the second bearing part and passing through a hole in the first bearing part with play in the direction of the end wall, and the screw being screwed into a threaded sleeve in the base.

11. The battery tray of claim 1, wherein battery tray is mounted in a region of a lower longitudinal side of the base in a connecting bracket.

12. A battery tray for a battery housing of a motor vehicle battery, the battery housing having outwardly directed projections on sides in each case facing away from one another in the base region, wherein the battery tray has a base for receiving the battery housing in the region of the base thereof, sleeves in a region of the base for receiving a bracket to be connected to the base, side walls on two sides facing away from each other, an end wall connected to the side walls and a clamping element which is connectable to the base, wherein the end wall and a first side wall of the side walls are provided with groove-shaped recesses running parallel to the base for the insertable receiving of those projections of the battery housing that face the walls, and, for the engagement behind that projection of the battery housing that faces the clamping element, the clamping element is connectable to the base on that side of the battery tray that faces away from the end wall, characterized in that part of the clamping element is a first block-forming element, for positioning the battery housing on the side thereof facing the second side wall of the side walls, and the second side wall has a second block-forming element in the region of the end wall, for positioning the battery tray on the side thereof facing the second side wall.

13. The battery tray of claim 1, further comprising the battery housing arranged with the side walls in a transverse direction of the motor vehicle.

\* \* \* \* \*